(12) United States Patent
Yeh

(10) Patent No.: US 7,331,631 B1
(45) Date of Patent: Feb. 19, 2008

(54) PILLOW CUSHION AND SEAT HAVING THE SAME

(76) Inventor: Jui-Kuan Yeh, 11F., No. 117, Sec. 1, Jhongcheng Rd., Shihlin District, Taipei City (TW)

( * ) Notice: Subject to any disclaimer, the term of this patent is extended or adjusted under 35 U.S.C. 154(b) by 0 days.

(21) Appl. No.: 11/711,804

(22) Filed: Feb. 28, 2007

(30) Foreign Application Priority Data

Aug. 31, 2006 (CN) ............................... 95215418 U

(51) Int. Cl.
*A47C 7/36* (2006.01)
(52) U.S. Cl. ........................... 297/391; 297/397; 5/636
(58) Field of Classification Search ................ 297/391, 297/397; 5/636, 645
See application file for complete search history.

(56) References Cited

U.S. PATENT DOCUMENTS 3,574,397 A * 4/1971 Norriss ........................ 297/391
4,285,081 A * 8/1981 Price .............................. 5/637
4,300,249 A * 11/1981 Taylor ............................ 4/661
7,168,765 B2 * 1/2007 Meiller et al. .......... 297/396 X

* cited by examiner

*Primary Examiner*—Anthony D. Barfield
(74) *Attorney, Agent, or Firm*—Bacon & Thomas PLLC

(57) ABSTRACT

The present invention discloses a pillow cushion having a main body, and the main body includes a headrest portion, an accommodating portion and a neck rest portion. The headrest portion is concavely disposed on a top side of the main body and coupled to a front side of the main body, with an end extended to the top side, and another end extended to the front side. The accommodating portion is concavely disposed on the front side of the main body and both lateral sides of the headrest portion. The neck rest portion is concavely disposed on the front side of the main body with an end coupled to another end of the headrest portion, and another end proximate to the front side of the main body for supporting heads of different sizes and providing comfortable supports to the head without leaning towards a side of the pillow cushion.

6 Claims, 5 Drawing Sheets

Section α-α

PILLOW CUSHION AND SEAT HAVING THE SAME

FIELD OF THE INVENTION

The present invention relates to a pillow cushion, and more particularly to a pillow cushion installed to a seat.

BACKGROUND OF THE INVENTION

As we are living in an era with continuously changing innovations, various different user-friendly commercial products are developed and introduced constantly to the market, and these products indispensable to our life bring us tremendous convenience, and thus consumers have increasingly higher demands on daily products. The convenience and effectiveness of services and the user-friendly design of the daily products become important indexes for determining whether or not the living standard and manufacturing technology of a country can lead other countries.

Innovative daily products are developed constantly, and these daily products include but not limited to a pillow cushion, and people not only demand a comfortable ventilating pillow cushion, but also require an ergonomic design of the pillow cushion to meet the requirements of different occasions. Thus, it is a trend to develop products with an ergonomic design to improve their market share.

In applications of a diversified design of a pillow cushion used in a specific occasion such as the seat of a tour bus, an airplane or a transportation means, the pillow cushion provides a comfort trip for bus passengers and airplane travelers. Referring to FIG. 1 for a conventional pillow cushion installed to a seat, the pillow cushion has a main body 1 and two extended members 12, and the two extended members 12 are installed on a lateral side of the main body 1 and proximate to both ends of the main body 1, and the two extended members 12 are proximate to an end on the opposite side of the main body 1, such that the pillow cushion is substantially in a U-shape for resting a human head, and travelers can rest on the main body 1 for a long time, and the two extended members 12 can provide supports to both lateral sides of the human head, and improve the comfort of the seat.

However, the distance between the two extended members 12 is fixed, so that if a human head rests on the main body 1, the two extended members 12 cannot support different sizes of heads. Furthermore, the head must lean towards a side of the main body 1 to rest the head on one of the ends of the two extended members 12, and thus the brain, the vertebrate and shoulder are compressed due to the improper posture or movement for a long time. Aches or injuries of the soft tissue of a human body may result, and thus it is good news to consumers, if related manufacturers and designers can find a way of supporting human heads of different sizes, relaxing a traveler's physique, releasing tiredness and achieving the effect of releasing pressures.

SUMMARY OF THE INVENTION

In view of the shortcomings of the prior art, the inventor of the present invention based on years of experience in the related industry to conduct extensive researches and experiments, and finally developed a pillow cushion in accordance with the present invention to improve the shortcomings of the conventional pillow cushion installed to a seat that cannot fit different sizes of heads resting on the main body of the pillow cushion or users have lean towards a side of the pillow cushion to obtain the support.

Therefore, it is a primary objective of the present invention to provide a pillow cushion having a main body, and the main body comprises a headrest portion, an accommodating portion and a neck rest portion. The headrest portion is concavely disposed on a top side of the main body that is coupled to a front side of the main body, and an end of the headrest portion is extended to the top side of the main body, and another end of the headrest portion is extended to the front side of the main body. The accommodating portion is concavely disposed on the front side of the main body and on both lateral sides of the headrest portion. The neck rest portion is concavely disposed on the front side of the main body, and an end of the neck rest portion is coupled to another end of the headrest portion, and another end of the neck rest portion is proximate to an end of the front side of the main body and opposite to the top side of the main body, such that a human body can rest on the main body of the pillow cushion, and support heads of different sizes, and travelers no longer need to lean their head towards a lateral side of the main body of the pillow cushion to obtain comfortable supports to the head.

Another objective of the present invention is to provide a seat having a pillow cushion, and the present invention includes a seat and a main body, and the seat has a backrest, and an end of the backrest is coupled to an edge of the top side of seat, and another end of the backrest is extended out from the top side of the seat, and the main body is disposed on another end of the backrest, such that the seat and the main body are integrated as a whole for providing the comforts of good touch and ventilation when a human body rests on the seat.

To make it easier for our examiner to understand the objective, technical characteristics and effects of the present invention, preferred embodiments will be described with accompanying drawings as follows:

DETAILED DESCRIPTION OF THE PREFERRED EMBODIMENTS

Figure 1:
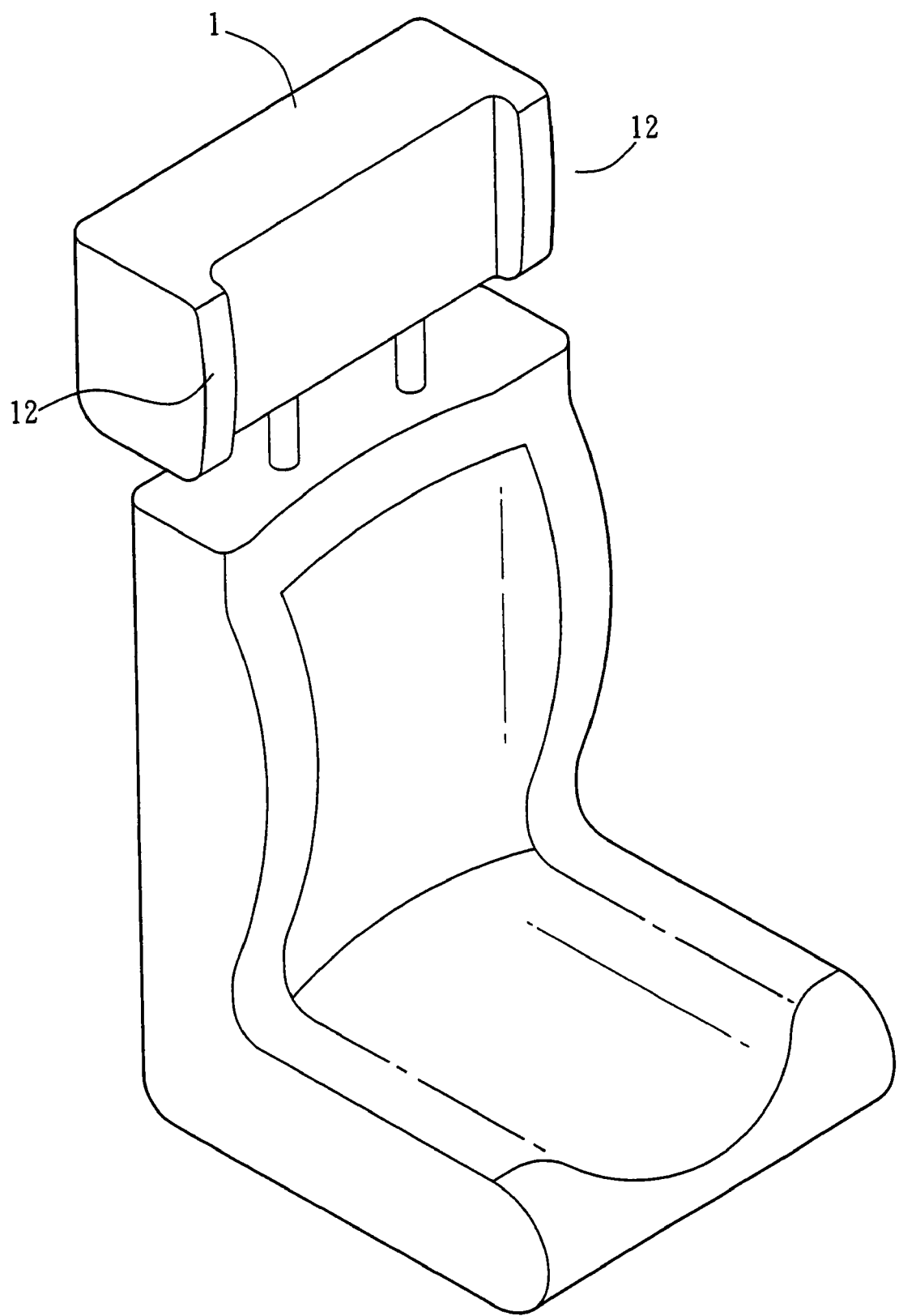
FIG. 1 is a schematic view of a conventional pillow cushion of a seat.
Figure 2:
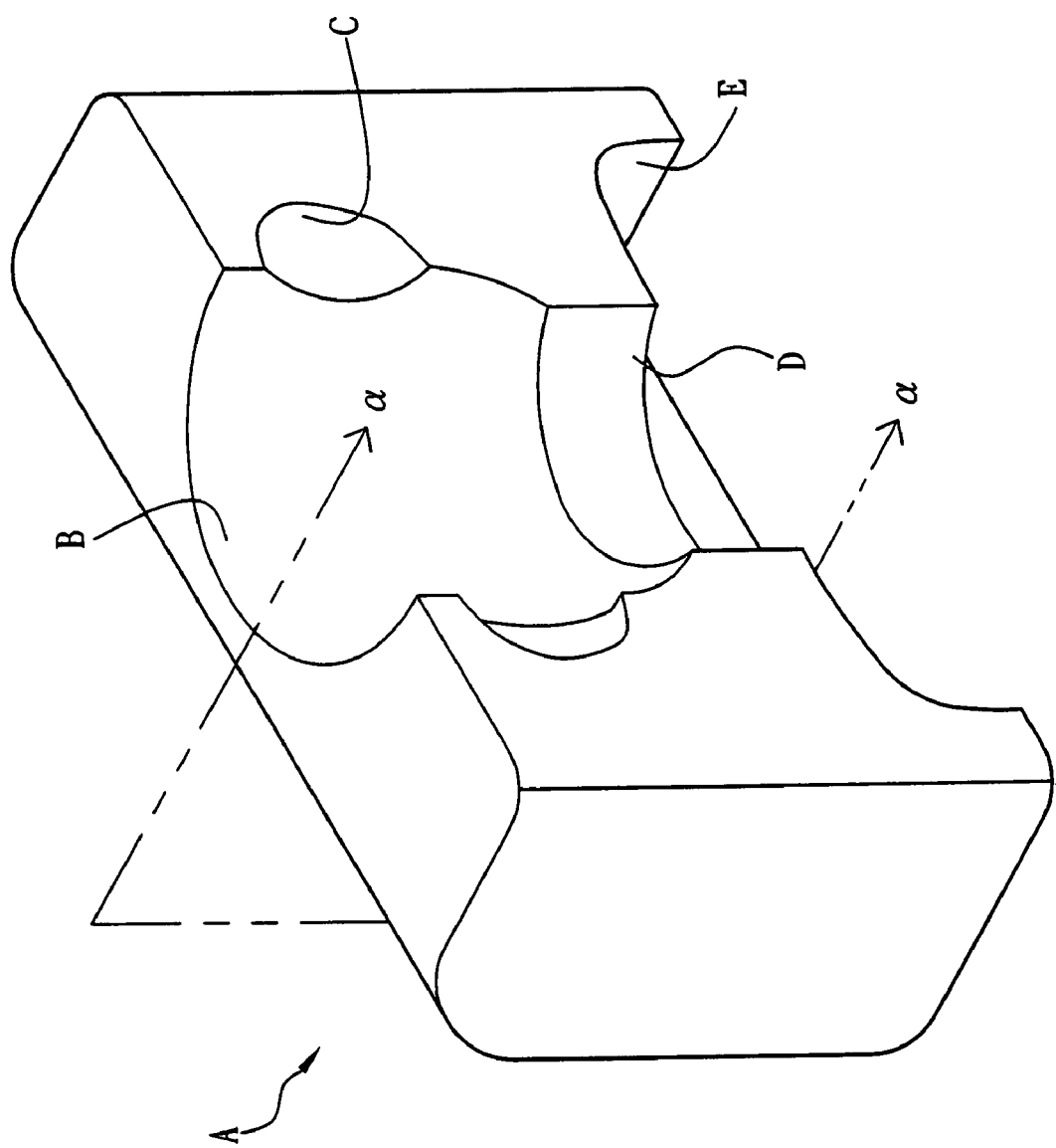
FIG. 2 is a schematic view of a pillow cushion of the present invention.

Referring to FIG. 2 for a pillow cushion of the present invention, the pillow cushion has a main body A, and the main body A comprises a headrest portion B, an accommodating portion C and a neck rest portion D. The headrest portion B is concavely disposed on a top side of the main body that is coupled to the front side of the main body, and an end of the headrest portion B is extended to the top side of the main body A, and another end of the headrest portion B is extended to the front side of the main body A. The accommodating portion C is concavely disposed on the front side of the main body A and on both lateral sides of the headrest portion B. The neck rest portion D is concavely disposed on the front side of the main body A, and an end of the neck rest portion D is coupled to another end of the headrest portion B, and another end of the neck rest portion D is proximate to an end of the main body that is opposite to the top side of the main body A. The headrest portion B, the accommodating portion C and the neck rest portion D are coupled with each other.

If a head rests on the main body A, the headrest portion B can support different sizes of traveler's heads, and comfortably wrap and support both lateral sides of the head. In the meantime, the accommodating portion C is provided for accommodating the travelers' ears with a perfect fit, so that the ears will not be pressed or bent and will maintain good hearing. The neck rest portion D can support different widths of the travelers' necks and provide comfortable perfect fits for the head and neck to be rested on the headrest portion B and the neck rest portion D to achieve the best pressure releasing effect.

In this embodiment of the invention as shown in FIG. 2, the main body A further comprises a shoulder rest portion E concavely disposed on a front side of the main body A that is coupled to the bottom side of the main body A, and an end of the shoulder rest portion E is coupled to another end of the neck rest portion D, and another end of the shoulder rest portion E is proximate to the bottom side of the main body A. If a human body rests on the main body A, not only the neck obtains comfortable support, but the weight exerted on the shoulder can be released, since the shoulder is rested ergonomically in the concave shoulder rest portion E.

Figure 3:
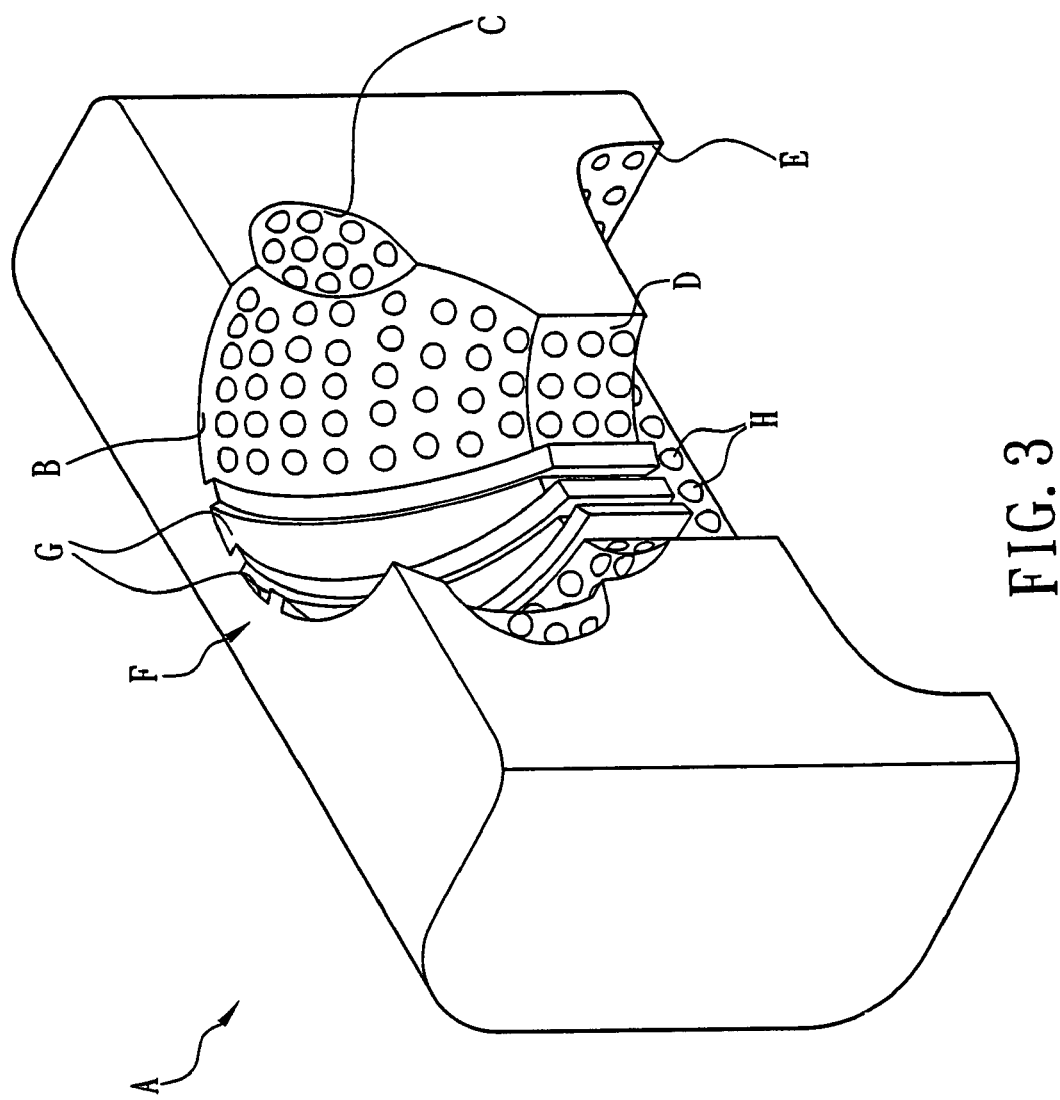
FIG. 3 is a perspective view of a pillow cushion of the present invention.

In this embodiment as shown in FIG. 3, the main body A further comprises a pressure release portion F, and an end of the pressure release portion F is coupled to an end of the headrest portion B that is coupled to the top side of the main body A, and another end of the pressure release portion F is passed through the headrest portion B and extended to another end connected to the neck rest portion D, such that when the head rests on the headrest portion B and the neck rest portion D, the traveler's skin will be in a direct contact with the pressure release portion F to effectively release the pressure produced by the weight of the human body, so as to improve the comfort of resting.

In this embodiment as shown in FIG. 3, the pressure release portion F is comprised of a plurality of grooves G, and the grooves G are extended parallelly from an end of the pressure release portion F to another end of the pressure release portion F, so that the grooves G can flexibly change the area of the pressure release portion F in contact with the human head and neck for the support on both lateral sides of the human head and neck and improve the level of ventilation of the human head, neck and shoulder.

Figure 4:
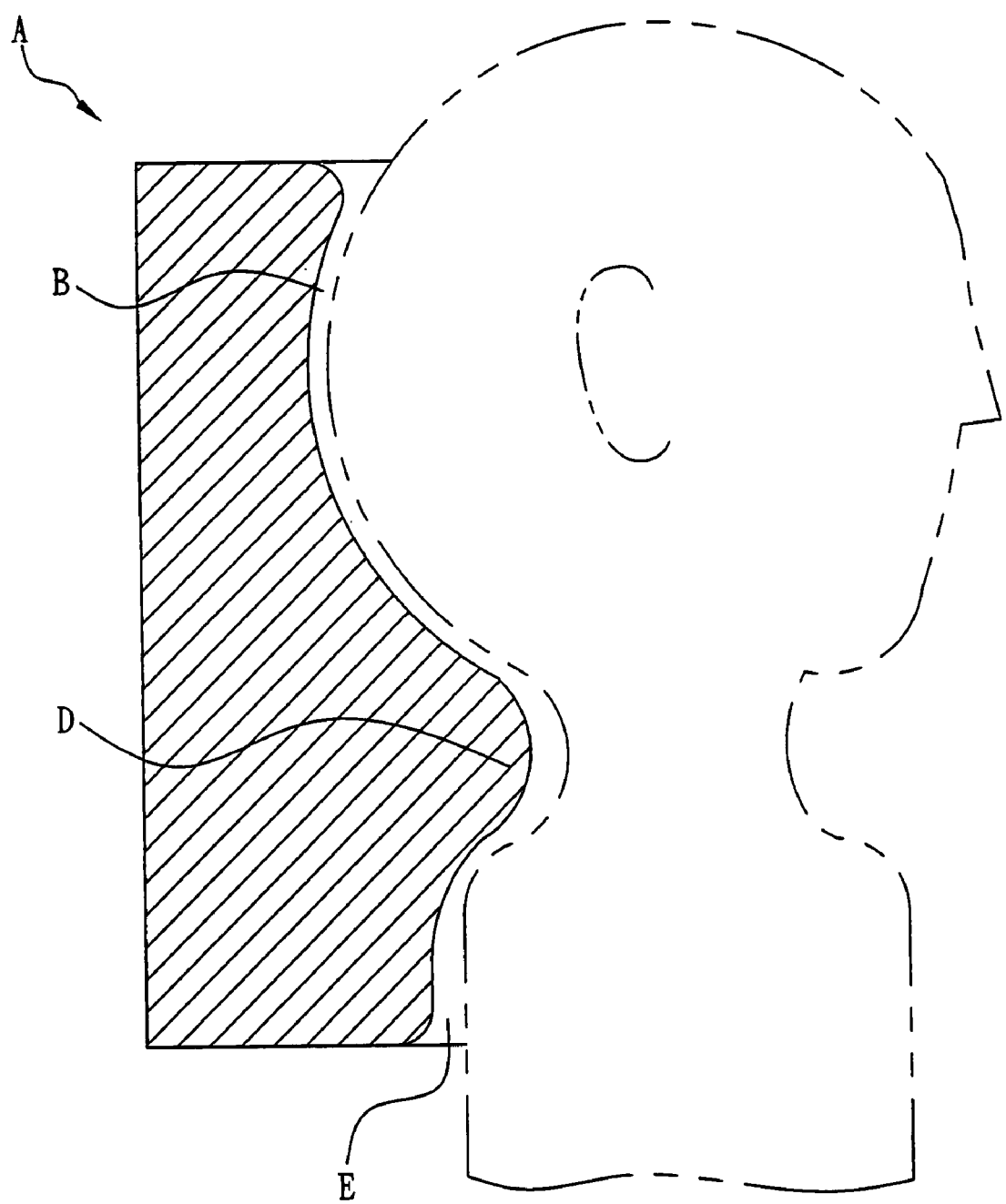
FIG. 4 is a cross-sectional view of Section a-a of FIG. 3.

In this embodiment as shown in FIG. 4, the recessions at the bottom side of the headrest portion B and the shoulder rest portion E is closer to the rear side of the main body A than the neck rest portion D, and this ergonomic design provides a comfortable perfect fit for the human head, neck and shoulder being rested on the main body A.

In this embodiment as shown in FIG. 3, the headrest portion B, the neck rest portion D and the shoulder rest portion E have a plurality of protruding lumps H disposed on the surfaces on both lateral sides of the pressure release portion F, such that if human head, neck and shoulder rest on the protruding lumps H, the protruding lumps H are in a soft contact with the human skin to achieve the ventilating and messaging effects.

Figure 5:
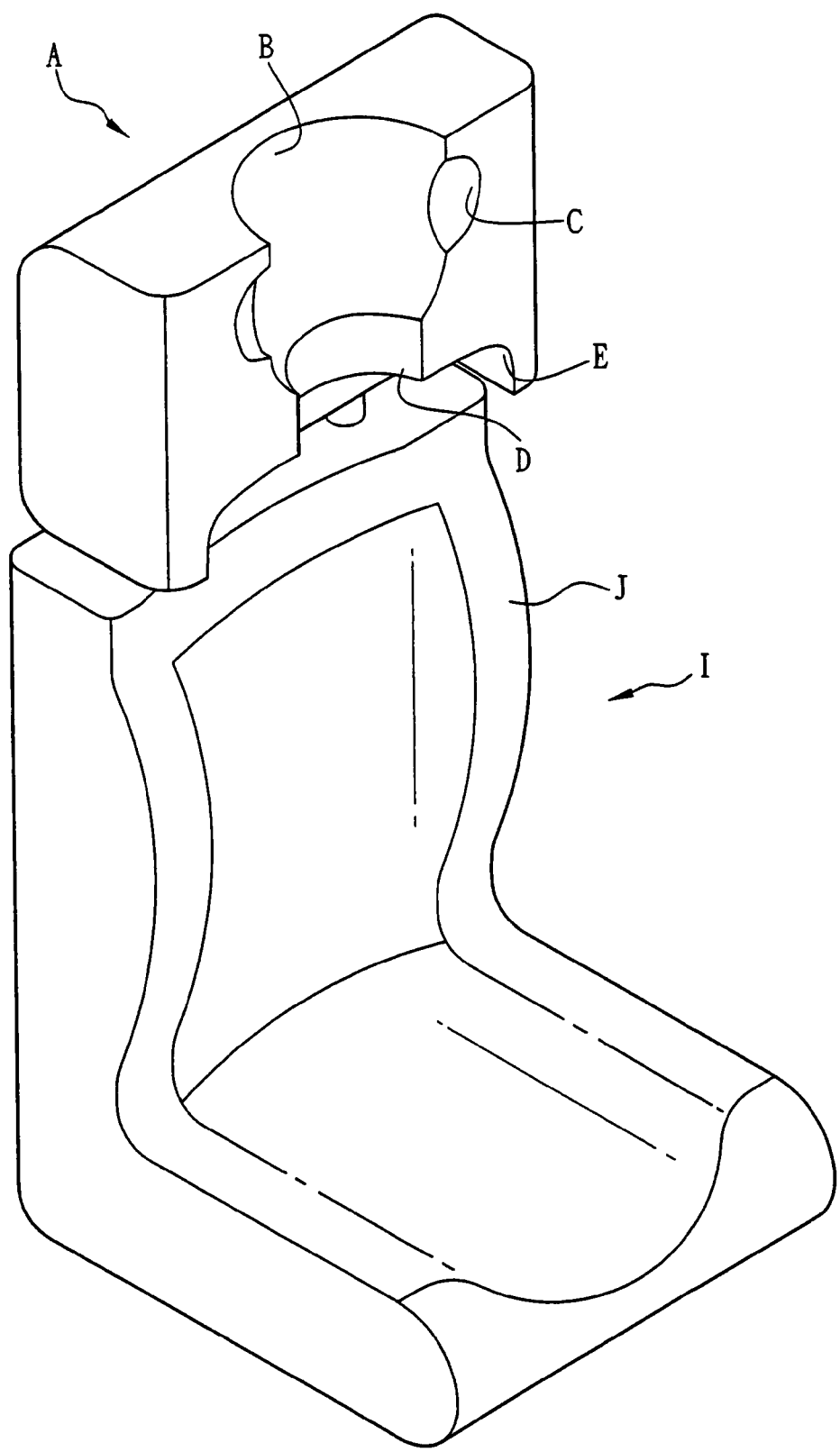
FIG. 5 is a schematic view of a seat having a pillow cushion of the present invention.

Referring to FIG. 5 for a seat having a pillow cushion in accordance with the present invention, the invention comprises a seat I and a main body A, wherein the seat I has a backrest J, and an end of the backrest J is coupled to an edge of the top side of the seat I, and another end of the backrest J is extended out from the top side of the seat I, and the main body A is disposed on another end of the backrest J, such that when a human main body sits in the seat I, the main body A gives a secured support to the head and provides a comfortable next-to-skin feeling and a good ventilation.

In a preferred embodiment of the present invention as shown in FIG. 2, the main body A comprises a headrest portion B, an accommodating portion C and a neck rest portion D. The headrest portion B is concavely disposed on the top side of the main body A that is coupled to the front side of the main body A, and an end of the headrest portion B is extended to the top side of the main body A, and another end of the headrest portion B is extended to the front side of the main body A, and the accommodating portion C is concavely and separately disposed on the front side of the main body A and both lateral sides of the headrest portion B. The neck rest portion D is concavely disposed on the front side of the main body A, and an end of the neck rest portion D is coupled to another end of the headrest portion B, and another end of the neck rest portion D is proximate to the front side of the main body A that is opposite to an end of the top side of the main body A, such that the headrest portion B, the accommodating portion C and the neck rest portion D are coupled with each other.

When the head rests on the main body A, the headrest portion B can support different sizes of the heads and comfortably wrap and support both lateral sides of the head. In the meantime, the accommodating portion C is provided for accommodating the user's ears with a perfect fit, such that the ears will not be compressed to maintain good hearing, and the neck rest portion D can support different widths of the travelers' necks and provide a comfortable prefect fit, so that the human head and neck can rest comfortably on the headrest portion B and the neck rest portion D, so as to achieve the best pressure releasing effect.

In a preferred embodiment of the present invention as shown in FIG. 2, the main body A further comprises a shoulder rest portion E concavely disposed on a front side of the main body A that is coupled to the bottom side of the main body A, and an end of the shoulder rest portion E is coupled to another end of the neck rest portion D, and another end of the shoulder rest portion E is proximate to the bottom side of the main body A. If a human body rests on the main body A, then the head and neck can be supported comfortably, and the shoulder rests on the ergonomic concavely curved shoulder rest portion E for releasing the pressure exerted on the shoulder.

In this embodiment as shown in FIG. 3, the main body A further comprises a pressure release portion F, and an end of the pressure release portion F is disposed at an end of the headrest portion B that is coupled to the top side of the main body A, and another end of the pressure release portion F is passed through the headrest portion B and extended to another end connected to the neck rest portion D. If a head rests on the headrest portion B and the neck rest portion D, the traveler's skin is in a direct contact with the pressure release portion F and the pressure caused by the body weight of the traveler can be released effectively, and the pressure release portion F can improve the comfort of resting the human body onto the cushion.

In this embodiment as shown in FIG. 3, the pressure release portion F is comprised of a plurality of grooves G, and the grooves G are extended parallelly from an end of the pressure release portion F to another end of the pressure release portion F, such that the area of the human head and neck in contact with the pressure release portion F can be extended flexibly to support both lateral sides of the human head and neck, and the level of ventilation for the human head, neck and shoulder can be improved.

In this embodiment as shown in FIG. 4, the recessions at the bottom of the headrest portion B and the shoulder rest portion E are closer to the rear side of the main body A than the neck rest portion D, and such ergonomic design gives a comfortable touch when a human head, neck or shoulder rests on the main body A.

In this embodiment as shown in FIG. 3, the headrest portion B, the neck rest portion D and the shoulder rest portion E have a plurality of protruding lumps H disposed on surfaces on both lateral sides of the pressure release portion F. If a human head, neck or shoulder rests on the protruding lumps H, the protruding lumps H will be in a soft contact with the human skin to achieve the effects of ventilation and massaging.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A pillow cushion, having a main body, and said main body comprising:
   a headrest portion, concavely disposed at a position where a top side of said main body is coupled to a front side of said main body, and an end of said headrest portion being extended to the top side of said main body, and another end of said headrest portion being extended to the front side of said main body;
   an accommodating portion, concavely disposed at the front side of said main body and on both lateral sides of said headrest portion;
   a neck rest portion, concavely disposed at the front side of said main body, and an end of said neck rest portion being coupled to another end of said headrest portion, and another end of said neck rest portion being proximate to an end of the front side of said main body and opposite to the top side of said main body;
   said main body further comprises a shoulder rest portion concavely disposed at a position where the front side of said main body is coupled to the bottom side of said main body, and an end of said shoulder rest portion is coupled to another end of said neck rest portion, and another end of said shoulder rest portion is proximate to the bottom side of said main body;
   said main body further comprises a pressure release portion, and an end of said pressure release portion is disposed at an end of said headrest portion that is connected to the top side of said main body, and another end of said pressure release portion is passed through said headrest portion and extended to another end connected to said neck rest portion; and
   wherein said pressure release portion is comprised of a plurality of grooves, and said grooves are extended in parallel from an end of aid pressure release portion to another end of said pressure release portion.

2. The pillow cushion of claim 1, wherein said headrest portion and the bottom side of said shoulder rest portion have a recession disposed closer to the rear side of said main body than said neck rest portion.

3. The pillow cushion of claim 2, wherein said headrest portion, said neck rest portion and said shoulder rest portion have a plurality of protruding lumps disposed on surfaces of both lateral sides of said pressure release portion.

4. A seat having a pillow cushion, comprising:
   a seat, having a backrest, and an end of said backrest being coupled to an end of a top side of said seat, and another end of said backrest being extended out from the top side of said seat;
   a pillow cushion, disposed on another end of said backrest;
   said pillow cushion has a main body and said main body comprises a headrest portion, concavely disposed at the top side of said main body that is coupled to a front side of said main body, and an end of said headrest portion being extended to the top side of said main body, and another end of said headrest portion being extended to the front side of said main body, an accommodating portion, concavely disposed at the front side of said main body and both lateral sides of said headrest portion, a neck rest portion, concavely disposed at the front side of said main body, and an end of said neck rest portion being coupled to another end of said headrest portion, and another end of said neck rest portion being proximate to an end of said main body front side that is opposite to the top side of said main body;
   said main body further comprises a shoulder rest portion concavely disposed at the front side of said main body that is coupled to the bottom side of said main body, and an end of said shoulder rest portion is coupled to another end of said neck rest portion, and another end of said shoulder rest portion is proximate to the bottom side of said main body;
   said main body further comprises a pressure release portion, and an end of said pressure release portion is disposed at an end of said headrest portion that is coupled to the top side of said main body, and another end of said pressure release portion is passed through said headrest portion and extended to another end connected to said neck rest portion; and
   wherein said pressure release portion is comprised of a plurality of grooves, and said grooves are extended in parallel from an end of said pressure release portion to another end of said pressure release portion.

5. The seat of claim 4, wherein said headrest portion and the bottom side of said shoulder rest portion have a recession closer to the rear side of said main body than said neck rest portion.

6. The seat of claim 5, wherein said headrest portion, said neck rest portion and said shoulder rest portion have a plurality of protruding lumps disposed on surfaces on both lateral sides of said pressure release portion.

* * * * *